US007012508B1

(12) United States Patent
Shiely et al.

(10) Patent No.: US 7,012,508 B1
(45) Date of Patent: Mar. 14, 2006

(54) SYSTEM AND METHOD FOR CONTROLLING A DOOR

(75) Inventors: Vince Shiely, Brookfield, WI (US); Jeffrey C. Blonski, Racine, WI (US); Paul A. Tharman, Pewaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 161 days.

(21) Appl. No.: 10/807,685

(22) Filed: Mar. 24, 2004

Related U.S. Application Data

(60) Provisional application No. 60/461,951, filed on Apr. 10, 2003.

(51) Int. Cl.
*B60R 25/10* (2006.01)

(52) U.S. Cl. ............................ 340/426.29; 340/539.1; 340/686.1; 340/687; 56/14.7

(58) Field of Classification Search ........... 340/426.29, 340/687, 539.1, 686.1; 56/10.1, 14.7
See application file for complete search history.

(56) References Cited

U.S. PATENT DOCUMENTS

| | | | | |
|---|---|---|---|---|
| 3,816,986 A | * | 6/1974 | Van Der Gaast | 56/202 |
| 4,061,956 A | | 12/1977 | Brown et al. | |
| 4,258,305 A | | 3/1981 | Anglin | |
| 4,357,564 A | * | 11/1982 | Deming et al. | 318/280 |
| 4,535,333 A | | 8/1985 | Twardowski | |
| 4,538,661 A | | 9/1985 | Henry et al. | |
| 4,540,929 A | | 9/1985 | Binkley | |
| 4,638,433 A | | 1/1987 | Schindler | |
| 4,750,118 A | | 6/1988 | Heitschel et al. | |
| 4,919,224 A | * | 4/1990 | Shyu et al. | 180/168 |
| 4,954,810 A | * | 9/1990 | Llewellyn | 340/686.1 |
| 4,988,992 A | | 1/1991 | Heitschel et al. | |
| 5,194,799 A | | 3/1993 | Tomantschger | |
| 5,442,340 A | | 8/1995 | Dykema | |
| 5,525,977 A | | 6/1996 | Suman | |
| D377,767 S | | 2/1997 | Doppelt et al. | |
| D380,696 S | | 7/1997 | Doppelt et al. | |
| 5,646,701 A | | 7/1997 | Duckworth et al. | |
| 5,680,134 A | | 10/1997 | Tsui | |
| 5,686,903 A | | 11/1997 | Duckworth et al. | |
| 5,699,044 A | | 12/1997 | Van Lente et al. | |
| 5,699,054 A | | 12/1997 | Duckworth | |
| 5,699,055 A | | 12/1997 | Dykema et al. | |
| 5,708,415 A | | 1/1998 | Van Lente et al. | |
| 5,748,101 A | | 5/1998 | Christensen et al. | |

(Continued)

FOREIGN PATENT DOCUMENTS

WO WO 00/75905 12/2000

OTHER PUBLICATIONS http://www.hooverfence.net/access/radio/clicker/clicker-sect1.htm.

(Continued)

*Primary Examiner*—Daryl C Pope
(74) *Attorney, Agent, or Firm*—Michael Best & Friedrich, LLP

(57) ABSTRACT

A door opener control system for outdoor power equipment. The system may generally include a transmitter coupled to the outdoor power equipment, a switch in communication with the transmitter, and a power supply, such that the transmitter is operable to remotely control the door between an open position and a closed position in response to a condition of the switch. The power supply may include a battery and the transmitter may be programmed to operate with a variety of receivers. The switch may be implemented with a variety of contact and non-contact type switches mounted on an instrument panel of the outdoor power equipment.

21 Claims, 8 Drawing Sheets

U.S. PATENT DOCUMENTS

| | | | |
|---|---|---|---|
| 5,751,224 | A | 5/1998 | Fitzgibbon |
| 5,793,185 | A | 8/1998 | Prelec et al. |
| 5,831,548 | A | 11/1998 | Fitzgibbon |
| 5,854,593 | A | 12/1998 | Dykema et al. |
| D409,577 | S | 5/1999 | Doppelt et al. |
| 5,940,280 | A | 8/1999 | Murai et al. |
| 5,949,349 | A | 9/1999 | Farris et al. |
| D415,734 | S | 10/1999 | Pomales |
| 6,072,404 | A | 6/2000 | Nolan et al. |
| 6,091,343 | A | 7/2000 | Dykema et al. |
| 6,100,663 | A | 8/2000 | Boys et al. |
| 6,127,922 | A | 10/2000 | Roddy et al. |
| 6,131,019 | A | 10/2000 | King |
| 6,140,938 | A | 10/2000 | Flick |
| 6,144,315 | A | 11/2000 | Flick |
| 6,169,492 | B1 | 1/2001 | Dabbish |
| 6,184,641 | B1 | 2/2001 | Crimmins et al. |
| 6,243,276 | B1 | 6/2001 | Neumann |
| 6,320,514 | B1 | 11/2001 | Flick |
| 6,346,792 | B1 | 2/2002 | Summerfield et al. |
| 6,362,771 | B1 | 3/2002 | Schofield et al. |
| 6,377,173 | B1 | 4/2002 | Desai |
| 6,396,408 | B1 | 5/2002 | Drummond et al. |
| 6,486,795 | B1 | 11/2002 | Sobel et al. |
| 2001/0038272 | A1 | 11/2001 | Fitzgibbon et al. |
| 2002/0034303 | A1 | 3/2002 | Farris et al. |
| 2002/0191794 | A1 | 12/2002 | Farris et al. |

OTHER PUBLICATIONS http://www.hooverfence.net/access/radio/clicker/clicker-chart.htm.

http://www.hooverfence.net/access/radio/clicker/clicker-brand.htm.

http://www.hooverfence.net/access/radio/clicker/clicker-sect2.htm.

http://www.hooverfence.net/access/radio/clicker/clicker-sect3.htm.

http:/www.aaremotes.com/clicunem.html.

http://www.hooverfence.net/access/radio/clicker/index.htm.

http://www.1stdooropeners.com.

http://www.bestpriceremotes.com.

Clicker Universal Garage Door Opener Remote Control pamphlet.

* cited by examiner

SYSTEM AND METHOD FOR CONTROLLING A DOOR

This application claims the benefit of prior filed provisional patent application No. 60/461,951 filed on Apr. 10, 2003.

BACKGROUND OF THE INVENTION

The invention generally relates to door opener control systems. More particularly, the invention relates to integrating a door opener control system into outdoor power equipment, such as a riding lawnmower.

A variety of systems exist for controlling a door, such as a garage door or other moveable barrier. Typically, systems include a transmitter that communicates with a receiver via wireless connection to change the state of the door (e.g., between open and closed positions). The receiver may be connected to the motor that controls door movement and the transmitter may be fixed at a location near the door, such as a wall of a garage. Alternately, the transmitter may be a portable unit with one or more buttons to control activation of the door. Some portable transmitters operate using rolling code or other security features. In addition, it is known to place transmitters within an automobile for remote actuation. Such systems are often employed so that an operator leaving their home may close the door and thereby improving home security. However, when a user operates outdoor power equipment, such as tractors, not in proximity to the house, an open garage door presents a security risk. Operators wishing to close the door must drive out of or to the door, exit the tractor, and manually activate the door. These steps take time and result in excessive starting and stopping of the tractor. In addition, current remote transmitters are not suited for attachment on lawn and garden equipment.

SUMMARY OF THE INVENTION

Disclosed is a system and method for integrating a door opener control system into outdoor power equipment such as a riding lawnmower. In one embodiment, the system generally includes a transmitter coupled to a piece of outdoor power equipment, a switch in communication with the transmitter, and a power supply. The transmitter is operable to remotely control the door between an open position and a closed position in response to a condition of the switch. The transmitter includes a circuit that transmits information to a one of several types of receivers associated with the door. The switch may be implemented with a variety of contact and non-contact type switches mounted on an instrument panel of the outdoor power equipment, and may communicate with the transmitter by a cable or a wireless connection. The power supply may include a battery or a part of an ignition system, such as a magnet moving past a coil or an alternator.

Additional embodiments of the invention include a method for integrating a door opener control system into outdoor power equipment having an engine. The method includes mounting a transmitter on a piece of outdoor power equipment, connecting the transmitter module to a power supply, mounting a switch on a panel of the outdoor power equipment accessible to an operator, establishing communication between the switch and the transmitter, and activating the transmitter in response to a condition of the switch.

DETAILED DESCRIPTION OF THE INVENTION

Figure 1:
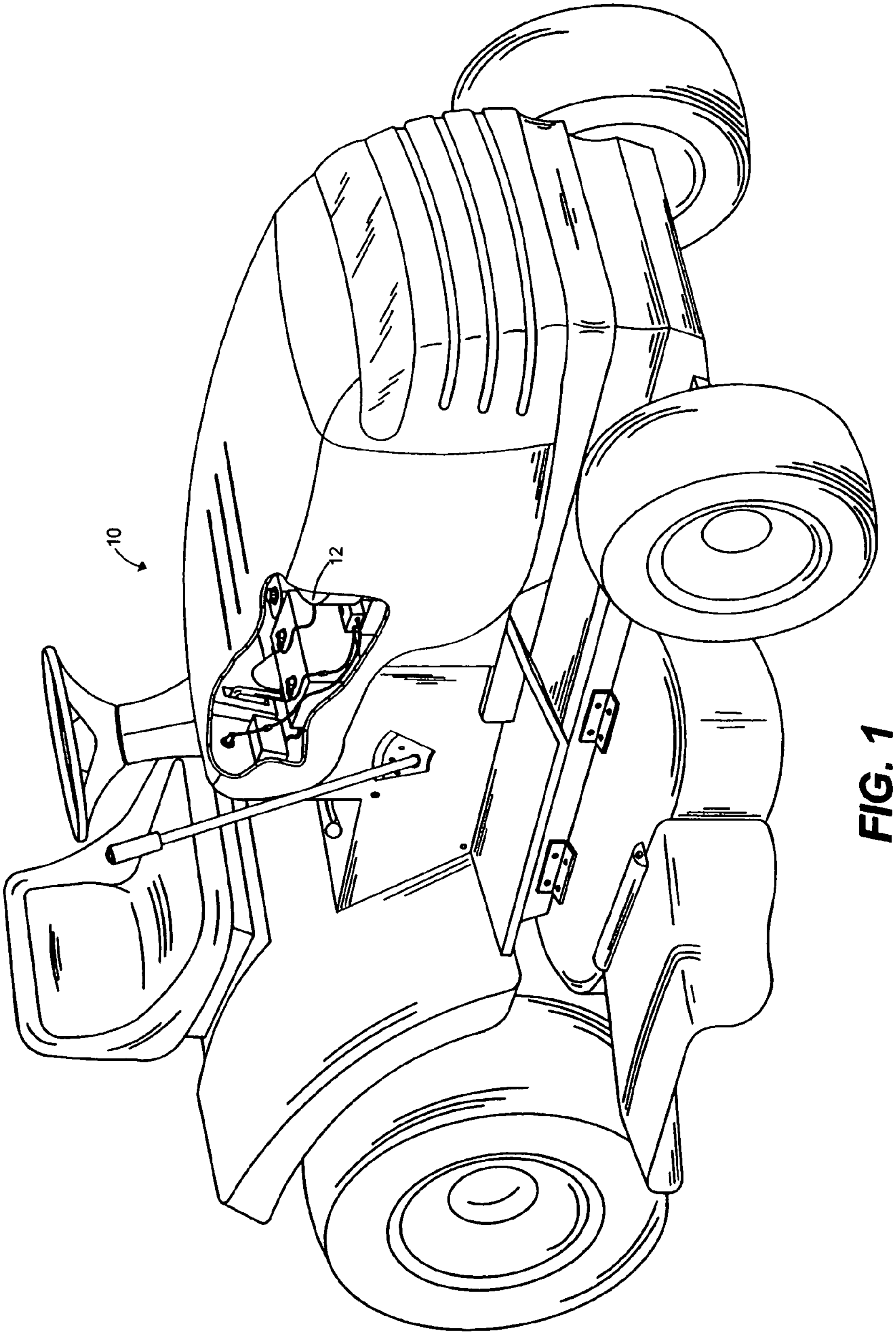
FIG. 1 is a perspective view of one exemplary piece of outdoor power equipment according to one embodiment of the invention.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. The terms “mounted,” “connected,” and “coupled” are used broadly and encompass both direct and indirect mounting, connecting, and coupling. Further, “connected” and “coupled” are not restricted to physical or mechanical connections or couplings.

It should be noted that the principles of the invention are illustrated as being applied to a riding lawnmower 10 (FIG. 1). However, the invention is not limited to lawn and garden tractors and may be implemented with other types of outdoor power equipment including farming-type tractors. The invention may be used with types of outdoor power equipment other than tractors, such as walk-behind lawnmowers and portable generators.

Figure 2:
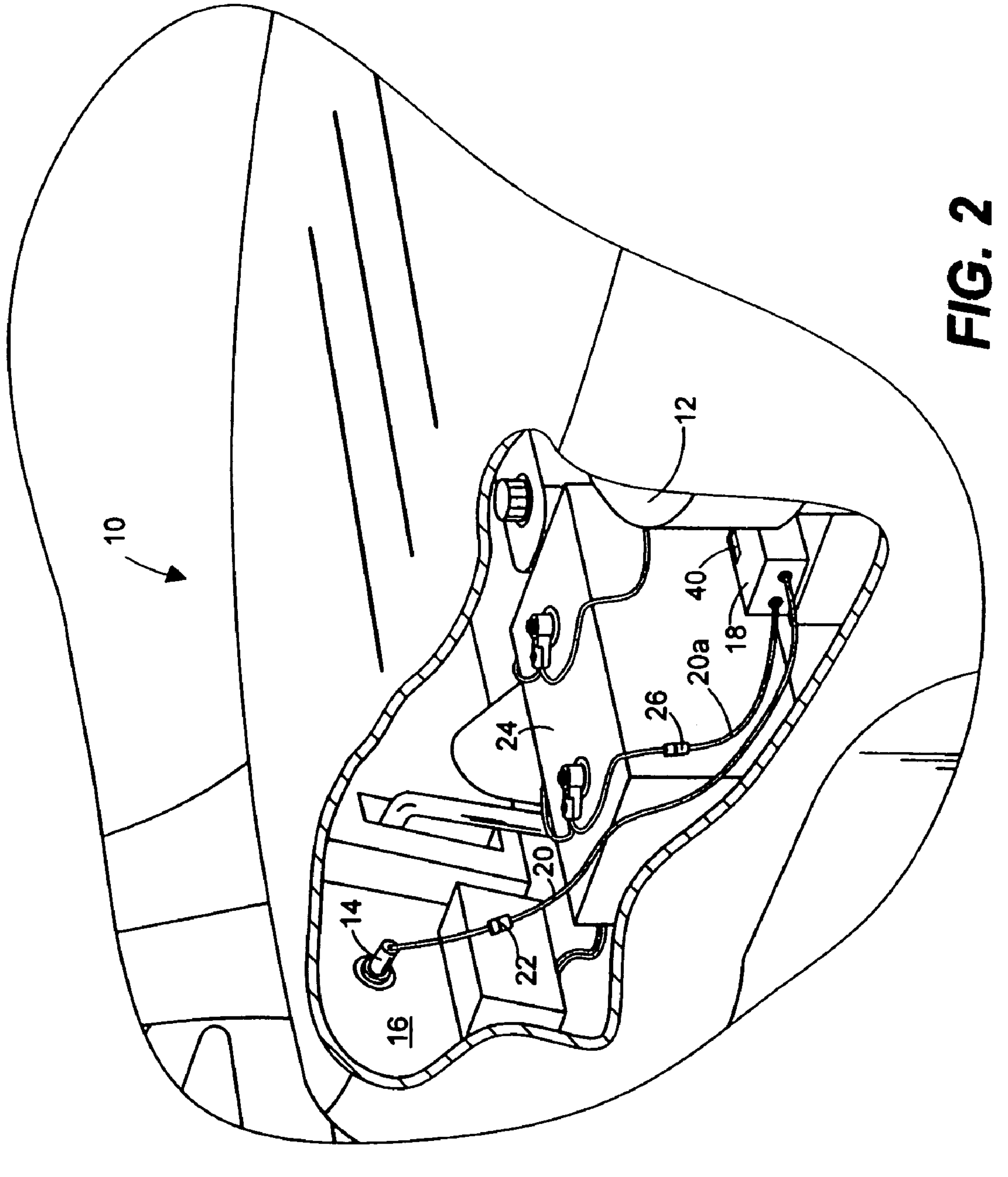
FIG. 2 is a detail view of the exemplary piece of outdoor power equipment including an exemplary configuration of components generally associated with one embodiment of the invention.

As illustrated in FIG. 1, the exemplary riding lawnmower 10 includes an engine 12, which may be a variety of internal combustion-type engines. FIG. 2 is a detail view of an exemplary compartment that houses the engine 10. A door switch 14, the back side of which is shown coupled to the instrument panel 16, is coupled to a transmitter 18 that is mounted on the engine 12. The hardware for mounting the door switch 14 to the instrument panel 16 may include a variety of fastening means such as clips, bolts, adhesives, rivets, or many others. In one embodiment, a wire or cable 20 connects the door switch 14 to the transmitter 18. A switch connector 22 may also be implemented to allow a modular design where, for example, the door switch 14 and transmitter 18 are installed separately and then coupled via the switch connector 22. Although the transmitter 18 is illustrated as being mounted to the engine 12, it should be noted that the transmitter 18 may be located in one of a plurality of locations including, for example, on a wall of the engine compartment or under the tractor seat. The transmitter 18 is connected to a power supply such as a battery 24. Alternatively, the transmitter 18 may be connected to an ignition system and receive power derived from an ignition coil or alternator. The power connection may be implemented with one of a variety of modular connections including a cable 20*a* and a plug 26, which may be similar to the switch connector 22. One should note that the power plug 26 and switch connector 22 are not necessary to implement the invention, but may be used to create a modular system in which installation and component replacement complexity is reduced that may be retrofit onto existing outdoor power equipment. As described below, the transmitter 18 may include one or more switches or buttons 40 used for code learning or other setup routines.

Figure 3:
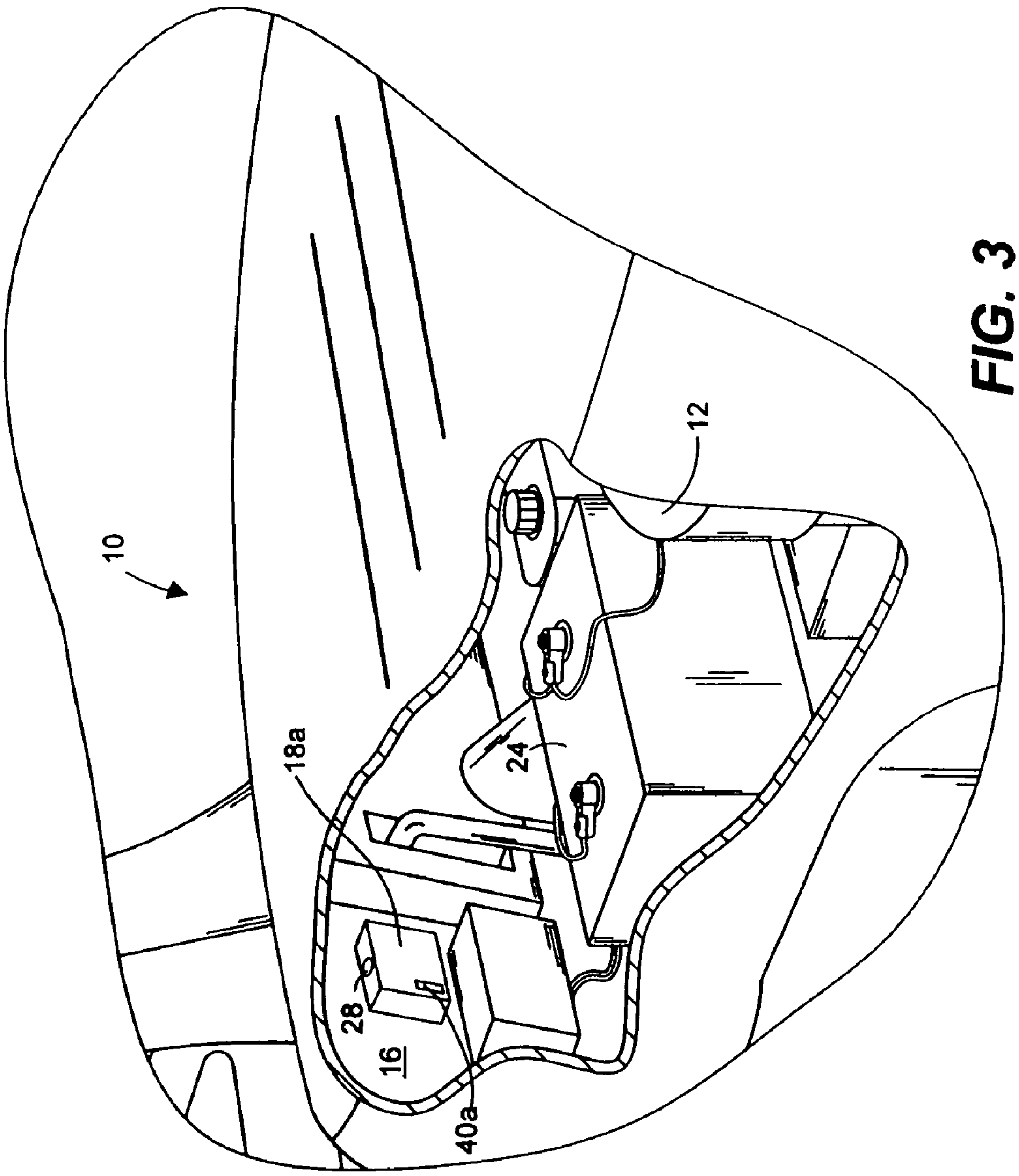
FIG. 3 is a detail view of another configuration of components generally associated with one embodiment of the invention.

FIG. 3 illustrates another embodiment of the invention where a transmitter 18*a* is integrated with the door switch 14 and includes one or more code learning switches or buttons 40*a* and an integrated battery 28, such as a lithium battery 28, as a power supply. In this embodiment, the transmitter 18*a* is relatively small such that it does not interfere with instrumentation behind the panel 16.

Figure 4:
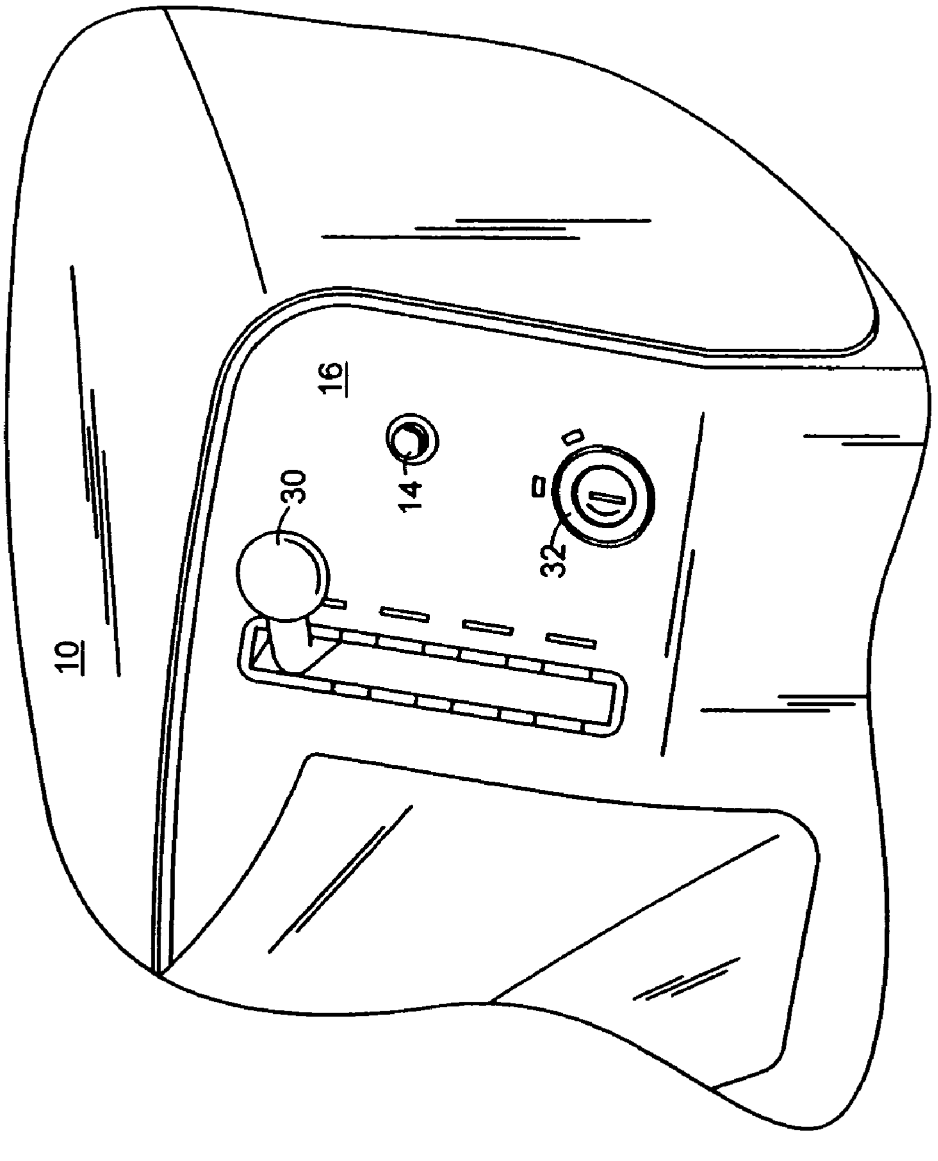
FIG. 4 is a detail view of an exemplary instrument panel associated with the exemplary outdoor power equipment.

FIG. 4 illustrates an exemplary instrument panel 16 associated with the riding lawnmower. The panel 16 may include a variety of controls and displays such as throttle control 30, an engine start key 32, and the like. In addition, the panel 16 includes an aperture with the door switch 14 disposed therein. The door switch 14 may be one of a variety of momentary contact switches that may be depressed or actuated by a user. Alternatively, the door switch 14 may be implemented with a non-contact type switch, such as a Hall or other magnetic-based switches.

Figure 5:
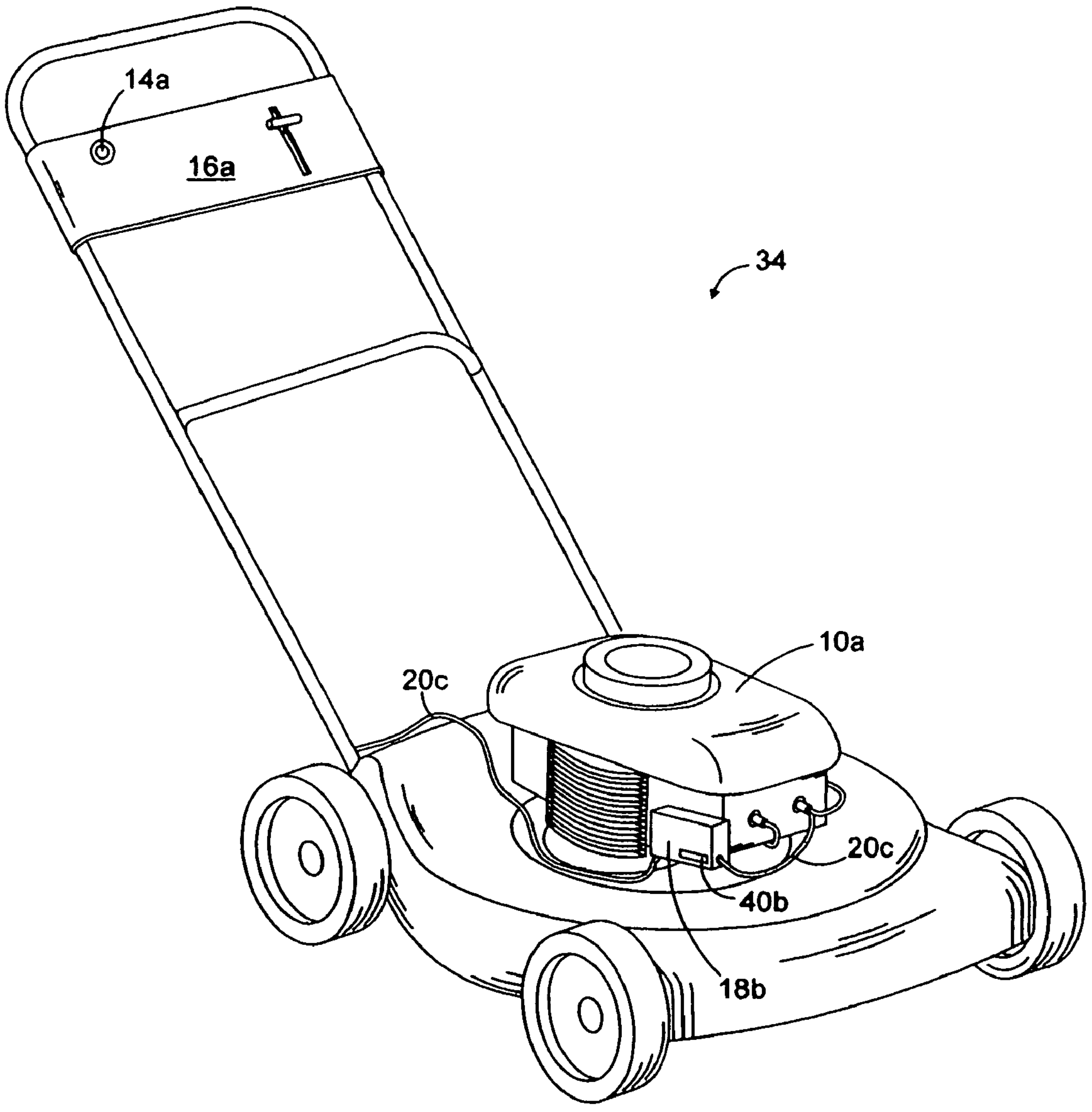
FIG. 5 is a perspective view of another exemplary piece of outdoor power equipment according to one embodiment of the invention.
Figure 6:
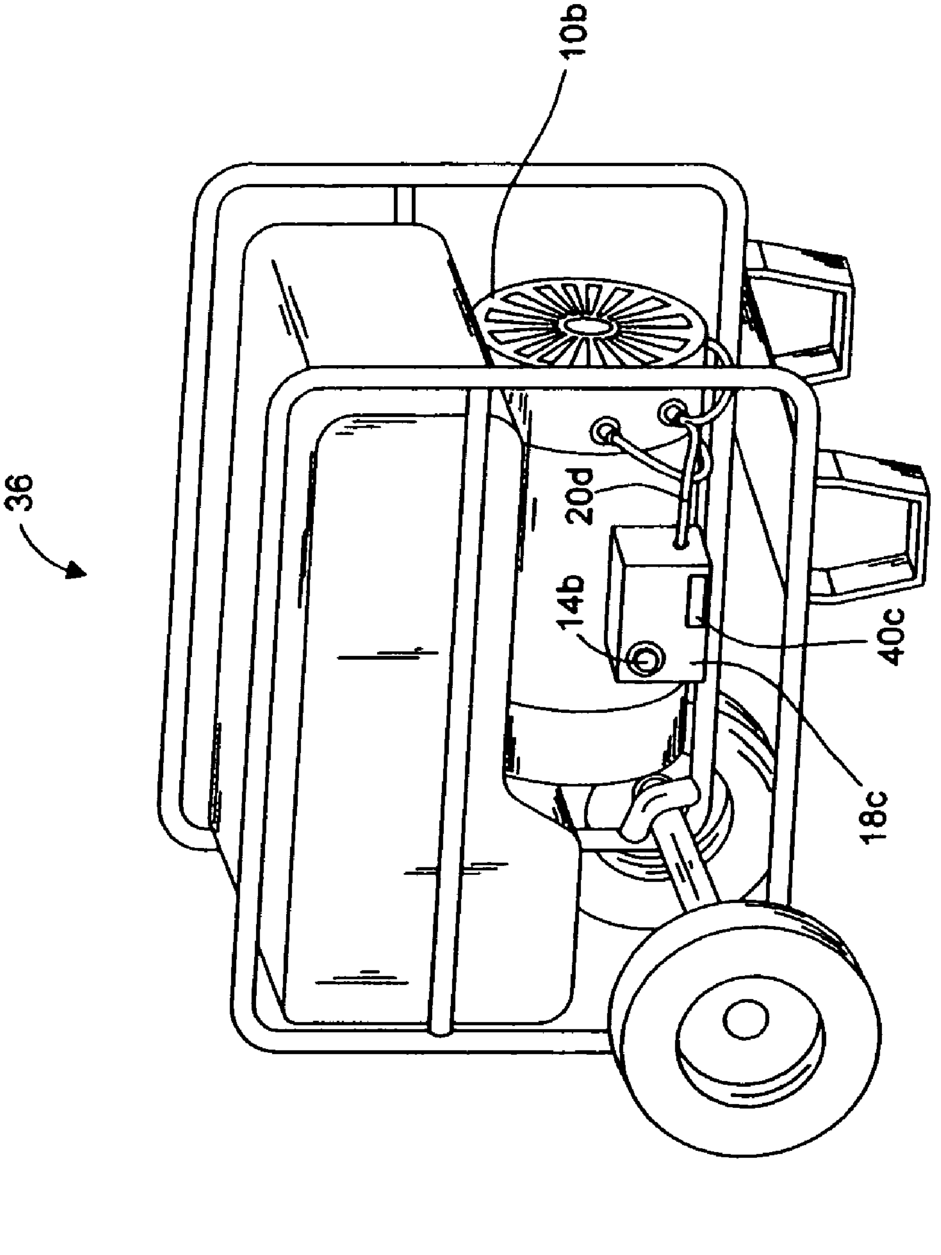
FIG. 6 is a perspective view of yet another exemplary piece of outdoor power equipment according to one embodiment of the invention.

FIGS. 5 and 6 illustrate other exemplary outdoor power equipment suitable for use with the invention. More specifically, FIG. 5 illustrates a walk-behind lawnmower 34 including an engine 10*a*. In one embodiment, a transmitter 18*b* is mounted to the engine 10*a* and includes one or more learning buttons or switches 40*b* as described below. In addition, a door switch 14*a* may be mounted to an instrument panel 16*a* and coupled to the transmitter 18*b* via cable 20*c*. In addition, the transmitter 18*b* may be coupled to the ignition system of the engine 10*a* using power cable 20*c* or similar means. FIG. 6 illustrates a portable generator 36 including an engine 10*b*. A transmitter 18*c* is mounted to the engine 10*b* and includes one or more code learning switches or buttons 40*c*. In one embodiment, a door switch 14*b* may be integrated with the transmitter 18*c* and, therefore, coupled to the engine 10*b*. The transmitter 18*c* may be coupled to a power supply, such as the ignition system of the engine 10*b*, using a cable 20*d* or other means.

Figure 7:
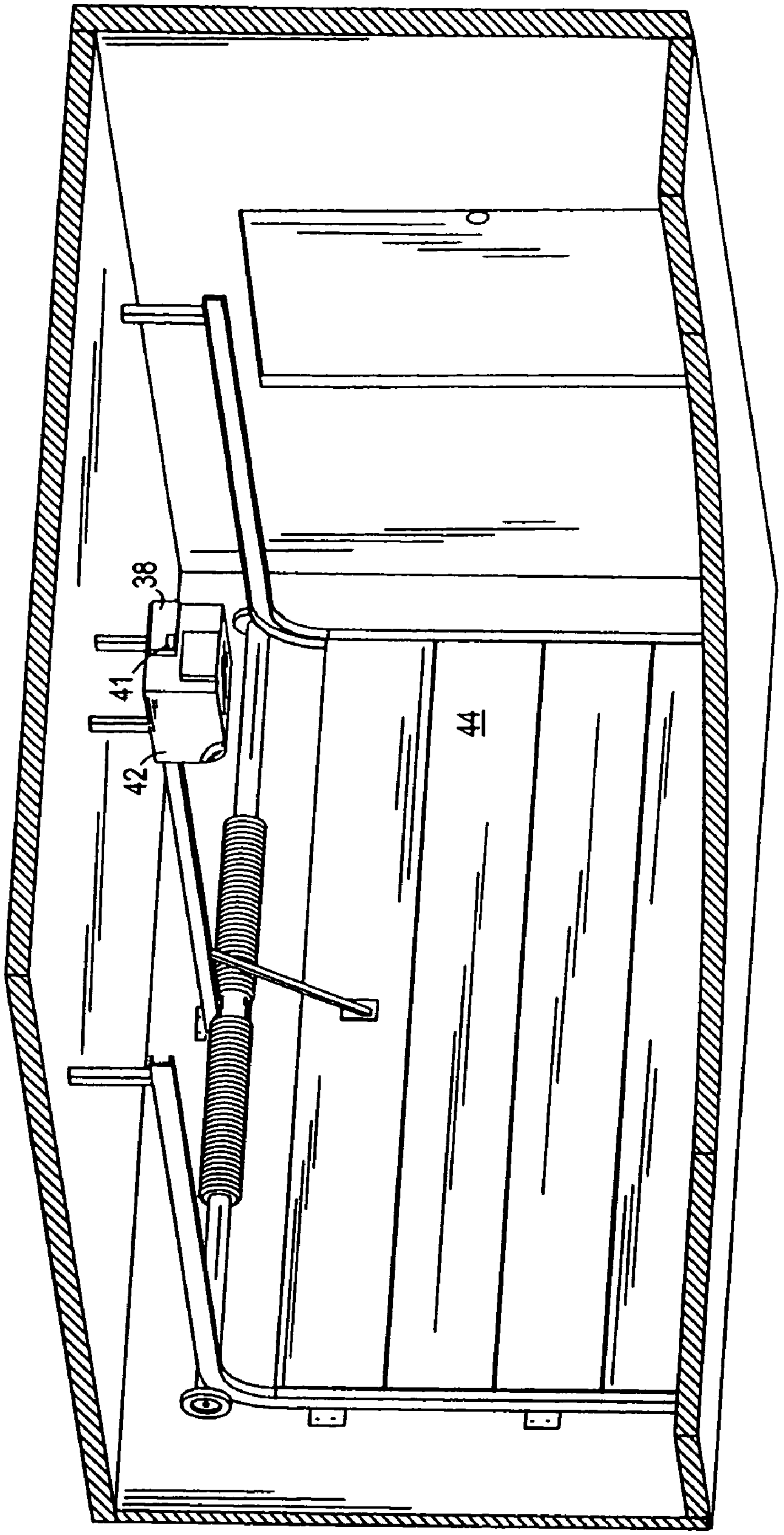
FIG. 7 illustrates an exemplary garage door assembly.

In operation, the transmitter 18, 18*a*, 18*b*, 18*c* of all embodiments is operable to communicate with a receiver 38, illustrated in FIG. 7, which in turn communicates with a drive system 42 to control the position of a movable barrier, such as a garage door 44. Communication between the transmitter and the exemplary receiver 38 may be carried out using a variety of known infrared or radio frequency transmission protocols. The transmitter may be programmed with receiver dual in-line package ("DIP") switches or other known code learning techniques such that the transmitter 18, 18*a*, 18*b*, 18*c* is operable to communicate with one of several types of receivers 38. For example, programming the transmitter may include actuating a code learning mechanism 41 on the receiver 38 while simultaneously actuating one or more code learning switches or buttons 40, 40*a*, 40*b*, 40*c* located on the transmitter (See FIGS. 2–6). The transmitter may also be implemented to function with other security features such as cycling or rolling codes that change with each actuation of the receiver 38.

Figure 8:
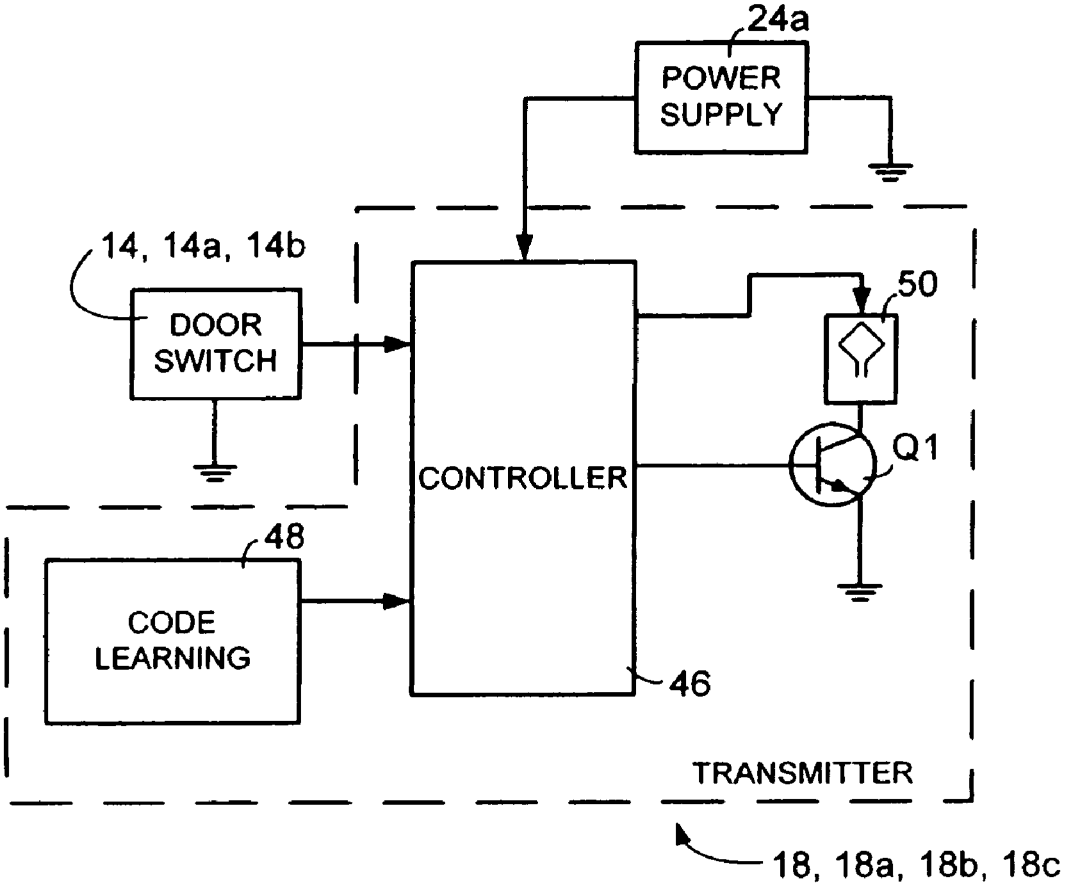
FIG. 8 is an exemplary schematic diagram of a transmitter circuit according to one embodiment of the invention.

FIG. 8 illustrates an exemplary schematic of the transmitter 18, 18*a*, 18*b*, 18*c*. The schematic includes an exemplary controller 46, a code learning/setting block 48, and a transmitting element 50. In at least one embodiment, components of the transmitter 18, 18*a*, 18*b*, 18*c* may be similar to those included in commercially available universal or programmable garage door transmitters. For example, embodiments of the invention may be implemented with a universal transmitter such as the Model CLT1 transmitter manufactured by the Clicker subsidiary of The Chamberlain Group, Inc. The code learning/setting block 48 may represent DIP switches, buttons, infrared elements, or other components, including those represented by switches 40, 40*a*, 40*b*, and 40*c*, used to implement known code learning techniques. As described above, the code learning/setting block 48 may be implemented to allow communication between a variety of receivers 38. The transmitter element 50 may be implemented with an antenna or other elements including light emitting diodes ("LEDs") and the controller 46 may include a variety of passive and/or semiconductor-based circuit components. It should be understood that the transmitter 18, 18*a*, 18*b*, 18*c* is not limited to the exemplary schematic in FIG. 8 and that other additional or alternative components may be included.

In operation, a user operating the tractor 10 may desire to open or close the door 44 and thus actuate the door switch 14 on the instrument panel 16 (FIG. 4). In one exemplary configuration, an input of the controller 46 receives a signal indicating the door switch 14 was actuated and, in response, switches the state of an output device such as a transistor Q1 (FIG. 8), or other device, such that the transmitter element 50 is activated. The transmitter element 50 emits or communicates data, which is received by the desired receiver, such as receiver 38. Having received a valid signal from the transmitter 18, 18*a*, 18*b*, 18*c*, the receiver 38 controls or instructs the driver system 42 to open or close the garage door 44.

As described above, one embodiment of the invention provides a method and system for integrating a door opener control system into outdoor power equipment. Various features and aspects of the invention are set forth in the following claims.

What is claimed is:

1. A door control system for outdoor power equipment having an engine, the system comprising:

a transmitter coupled to the outdoor power equipment;

a switch in communication with the transmitter; and a power supply;

wherein the transmitter is operable to remotely control the door between an open position and a closed position in response to a condition of the switch.

2. The system of claim 1, wherein the outdoor power equipment includes at least one of a tractor, a walk-behind lawnmower, and a portable generator.

3. The system of claim 1, wherein the transmitter includes a circuit that transmits information to a receiver associated with the door.

4. The system of claim 3, wherein the circuit is operable to perform security code calculations.

5. The system of claim 3, wherein the transmitter is operable to communicate with a plurality of types of receivers.

6. The system of claim 1, wherein the switch includes at least one of a contact and a non-contact type switch.

7. The system of claim 1, wherein the switch is in communication with the transmitter using a cable.

8. The system of claim 1, wherein the switch is mounted in on an instrument panel of the tractor remote from the transmitter.

9. The system of claim 1, wherein the switch and transmitter are integrated as a single unit mounted on an instrument panel.

10. The system of claim 1, wherein the transmitter is coupled to the engine.

11. The system of claim 1, wherein the power supply includes at least one of a battery, a magnet moving past a coil and an alternator.

12. A method of implementing a door control system for outdoor power equipment having an engine, the method comprising:

mounting a transmitter on the outdoor power equipment;

connecting the transmitter module to a power supply;

mounting a switch on a panel of the outdoor power equipment accessible to an operator;

establishing communication between the switch and the transmitter;

activating the transmitter in response to a condition of the switch; and moving the door between an open position and a closed position.

13. The method of claim 12, further comprising:

transmitting information to a receiver associated with the door.

14. The method of claim 13, further comprising:

operating the transmitter to perform security code calculations.

15. The method of claim 13, further comprising:

providing a transmitter operable to control a plurality of types of receivers.

16. The method of claim 12, further comprising:

providing at least one of a contact and a non-contact type switch.

17. The method of claim 12, wherein said communication establishing step includes coupling the switch to the transmitter module using a cable.

18. The method of claim 12, further comprising:

integrating the switch and transmitter as a single unit mounted on an instrument panel.

19. The method of claim 12, further comprising:

coupling the transmitter to the engine.

20. The method of claim 12, further comprising:

providing a power supply that includes at least one of a battery, a magnet moving past a coil, and an alternator.

21. The method of claim 12, further comprising:

providing outdoor power equipment that includes at least one of a tractor, a walk-behind lawnmower, and a portable generator.

* * * * *